US008655095B2

(12) United States Patent
Nojima et al.

(10) Patent No.: US 8,655,095 B2
(45) Date of Patent: Feb. 18, 2014

(54) IMAGE CORRECTION APPARATUS AND IMAGE CORRECTION METHOD

(75) Inventors: Yuri Nojima, Machida (JP); Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 12/949,424

(22) Filed: Nov. 18, 2010

(65) Prior Publication Data
US 2011/0123130 A1  May 26, 2011

Related U.S. Application Data

(63) Continuation of application No. PCT/JP2008/001371, filed on May 30, 2008.

(51) Int. Cl.
*G06K 9/40* (2006.01)
(52) U.S. Cl.
USPC .......................................................... 382/255
(58) Field of Classification Search
USPC .................... 382/255, 275, 272, 274
See application file for complete search history.

(56) References Cited

U.S. PATENT DOCUMENTS

| | | | | |
|---|---|---|---|---|
| 5,754,312 A * | 5/1998 | Fujimoto et al. | ................ | 358/2.1 |
| 5,932,998 A * | 8/1999 | LaWhite | ..................... | 324/76.42 |
| 6,738,501 B2 * | 5/2004 | Ma et al. | ....................... | 382/131 |
| 6,914,628 B1 * | 7/2005 | Kuwata et al. | ................ | 348/272 |
| 6,993,204 B1 * | 1/2006 | Yahil et al. | ..................... | 382/265 |
| 7,233,707 B2 * | 6/2007 | Matsuda et al. | .............. | 382/275 |
| 7,860,332 B2 * | 12/2010 | Lim et al. | ...................... | 382/255 |
| 8,430,513 B2 * | 4/2013 | Chang et al. | .................... | 353/98 |
| 2002/0118019 A1 * | 8/2002 | Nomura | ........................ | 324/509 |
| 2006/0266836 A1 * | 11/2006 | Bilcu et al. | ............... | 235/462.16 |
| 2007/0071355 A1 * | 3/2007 | Imai | .............................. | 382/266 |
| 2007/0172141 A1 * | 7/2007 | Bando | ........................... | 382/261 |
| 2007/0177060 A1 | 8/2007 | Tsuzuki | | |
| 2008/0002910 A1 * | 1/2008 | Ojima et al. | .................. | 382/277 |
| 2008/0175508 A1 * | 7/2008 | Bando et al. | ................. | 382/255 |
| 2008/0279468 A1 * | 11/2008 | Shiohara | ...................... | 382/254 |

FOREIGN PATENT DOCUMENTS

| | | |
|---|---|---|
| JP | 2004-32135 | 1/2004 |
| JP | 2004-336652 | 11/2004 |
| JP | 2006-11618 | 1/2006 |
| JP | 2006-11685 | 1/2006 |
| JP | 2006-333061 | 12/2006 |
| JP | 2007-251774 | 9/2007 |
| JP | 2007-281538 | 10/2007 |
| JP | 2007-295321 | 11/2007 |
| JP | 2007-300269 | 11/2007 |

OTHER PUBLICATIONS

Machine translation of IDS document JP 2006-11618 A.*
Machine translation of IDS document JP 2007-251774.*

(Continued)

*Primary Examiner* — Michelle Entezari
(74) *Attorney, Agent, or Firm* — Staas & Halsey LLP

(57) ABSTRACT

An image correction apparatus includes a smoothing unit, a blurred area detection unit, a correction amount calculation unit, and a correction unit. The smoothing unit smoothes an input image. The blurred area detection unit detects, for each pixel of a smoothed image obtained by the smoothing unit, whether or not each of the pixels is included in a blurred area. The correction amount calculation unit calculates an amount of a correction for a pixel that belongs to the blurred area based on the smoothed image. The correction unit corrects the input image by using the amount of a correction calculated by the correction amount calculation unit.

7 Claims, 16 Drawing Sheets

(56) References Cited

OTHER PUBLICATIONS

Machine translation of IDS document JP 2007-295321.*
International Search Report for PCT/JP2008/001371 mailed Jul. 29, 2008.
J.-G. Leu, "Edge Sharpening Through Ramp Width Reduction," Image and Vision Computing 18 (2000) 501-514.
Japanese Office Action issued Oct. 18, 2011 in corresponding Japanese Patent Application 2010-514265.

* cited by examiner

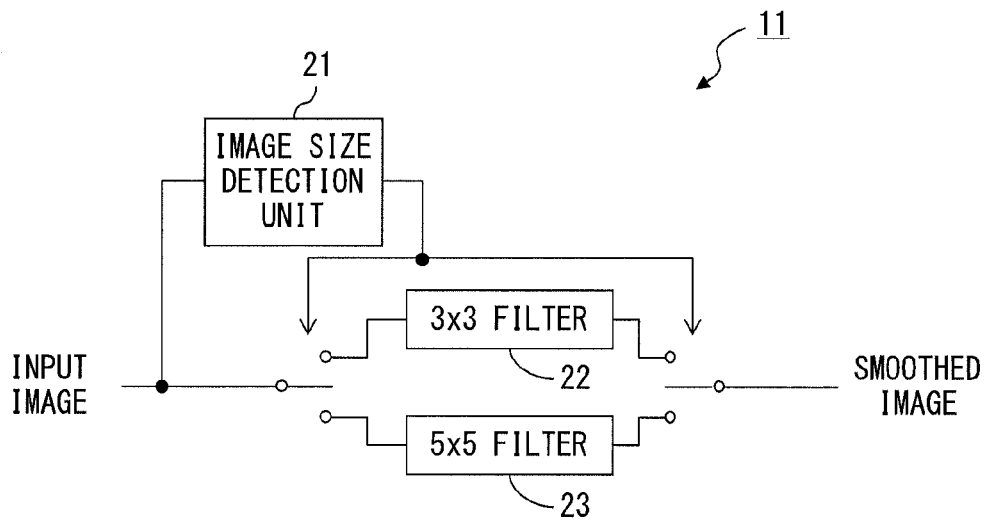
F I G. 4 A
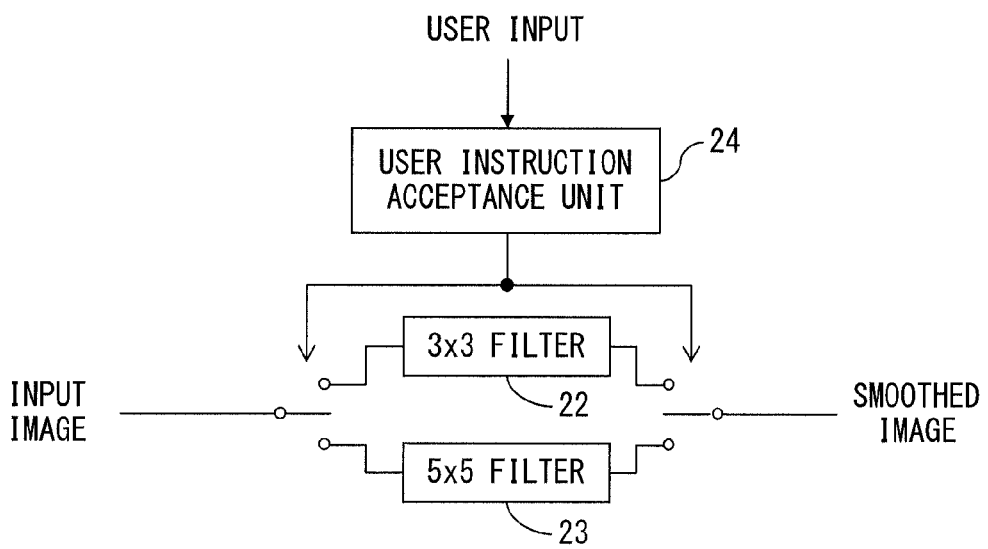
F I G. 4 B

| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |

F I G. 5 A

| $\frac{1}{25}$ | $\frac{1}{25}$ | $\frac{1}{25}$ | $\frac{1}{25}$ | $\frac{1}{25}$ |
|---|---|---|---|---|
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |

F I G. 5 B

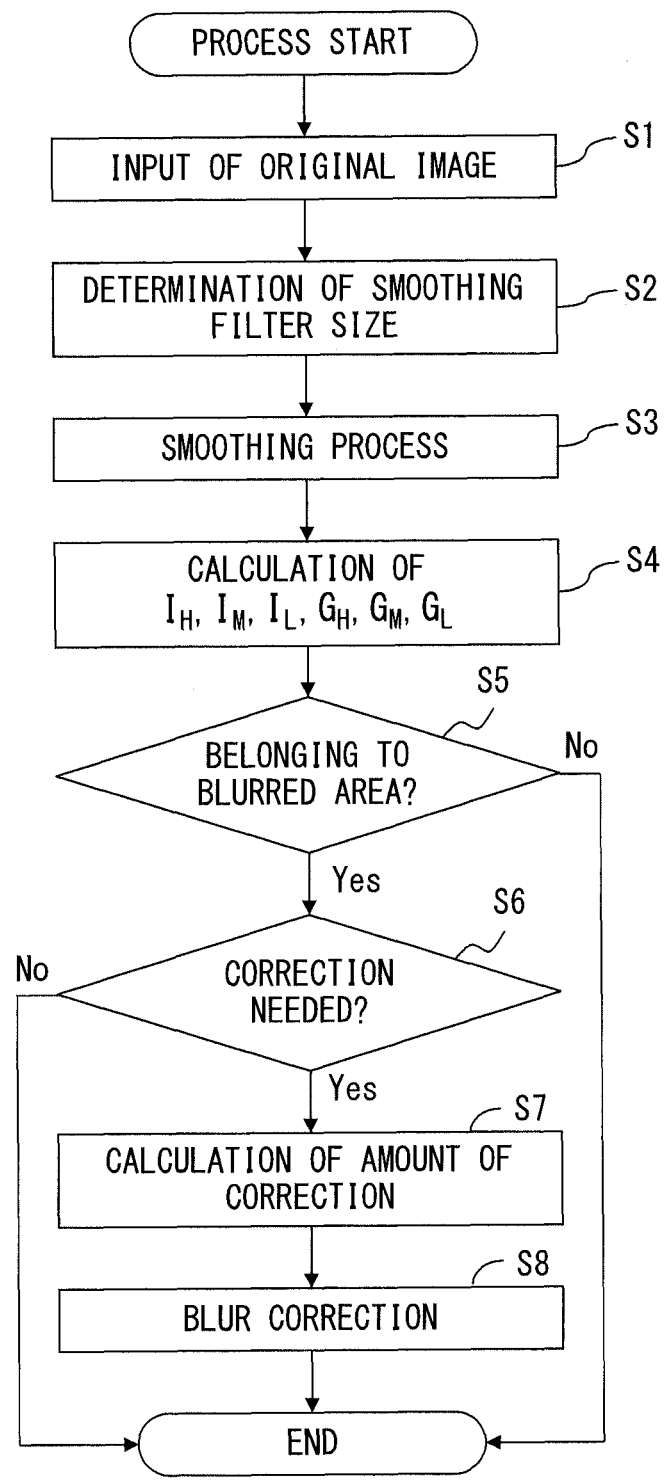
F I G. 7

|  |  |  |
|---|---|---|
| −1 | 0 | 1 |
| −2 | 0 | 2 |
| −1 | 0 | 1 |

X DIRECTION

F I G. 8 A

|  |  |  |
|---|---|---|
| 1 | 2 | 1 |
| 0 | 0 | 0 |
| −1 | −2 | −1 |

Y DIRECTION

F I G. 8 B

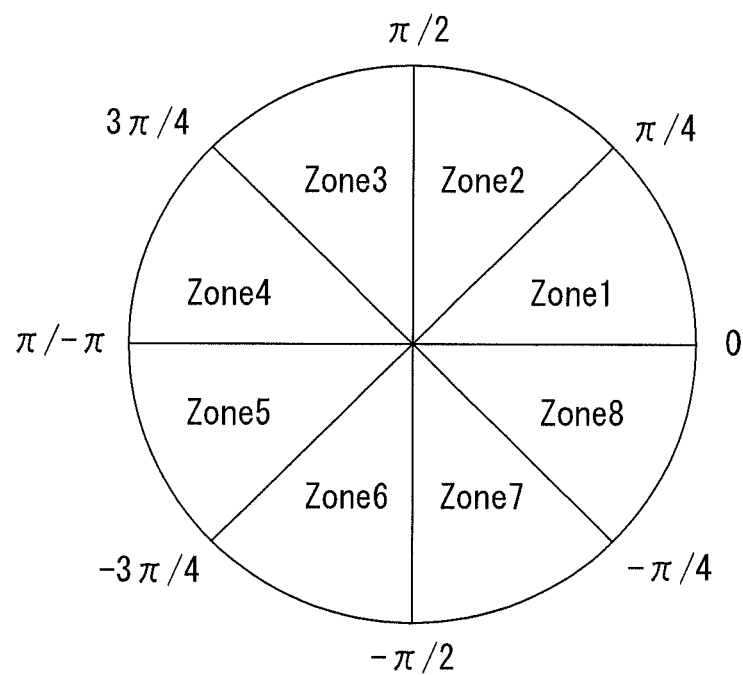
F I G. 9

| 0 | 0 | 0.25 |
|---|---|---|
| 0 | 0 | 0.5 |
| 0 | 0 | 025 |

$I_H(0)$

| 0.25 | 0 | 0 |
|---|---|---|
| 0.5 | 0 | 0 |
| 0.25 | 0 | 0 |

$I_H(\pi)$

| 0 | 0.5 | 0 |
|---|---|---|
| 0 | 0 | 0.5 |
| 0 | 0 | 0 |

$I_H(\pi/4)$

| 0 | 0 | 0 |
|---|---|---|
| 0.5 | 0 | 0 |
| 0 | 0.5 | 0 |

$I_H(-3\pi/4)$

| 0.25 | 0.5 | 0.25 |
|---|---|---|
| 0 | 0 | 0 |
| 0 | 0 | 0 |

$I_H(\pi/2)$

| 0 | 0 | 0 |
|---|---|---|
| 0 | 0 | 0 |
| 0.25 | 0.5 | 0.25 |

$I_H(-\pi/2)$

| 0 | 0.5 | 0 |
|---|---|---|
| 0.5 | 0 | 0 |
| 0 | 0 | 0 |

$I_H(3\pi/4)$

| 0 | 0 | 0 |
|---|---|---|
| 0 | 0 | 0.5 |
| 0 | 0.5 | 0 |

| 0 | 0.25 | 0 |
|---|---|---|
| 0 | 0.5 | 0 |
| 0 | 0.25 | 0 |

$I_M(0)$

| 0 | 0.25 | 0 |
|---|---|---|
| 0 | 0.5 | 0 |
| 0 | 0.25 | 0 |

$I_M(\pi)$

| 0.25 | 0 | 0 |
|---|---|---|
| 0 | 0.5 | 0 |
| 0 | 0 | 0.25 |

$I_M(\pi/4)$

| 0.25 | 0 | 0 |
|---|---|---|
| 0 | 0.5 | 0 |
| 0 | 0 | 0.25 |

$I_M(-3\pi/4)$

| 0 | 0 | 0 |
|---|---|---|
| 0.25 | 0.5 | 0.25 |
| 0 | 0 | 0 |

$I_M(\pi/2)$

| 0 | 0 | 0 |
|---|---|---|
| 0.25 | 0.5 | 0.25 |
| 0 | 0 | 0 |

$I_M(-\pi/2)$

| 0 | 0 | 0.25 |
|---|---|---|
| 0 | 0.5 | 0 |
| 0.25 | 0 | 0 |

$I_M(3\pi/4)$

| 0 | 0 | 0.25 |
|---|---|---|
| 0 | 0.5 | 0 |
| 0.25 | 0 | 0 |

$I_M(-\pi/4)$

F I G. 1 1

| 0.25 | 0 | 0 |
|---|---|---|
| 0.5 | 0 | 0 |
| 0.25 | 0 | 0 |

$I_L(0)$

| 0 | 0 | 0.25 |
|---|---|---|
| 0 | 0 | 0.5 |
| 0 | 0 | 0.25 |

$I_L(\pi)$

| 0 | 0 | 0 |
|---|---|---|
| 0.5 | 0 | 0 |
| 0 | 0.5 | 0 |

$I_L(\pi/4)$

| 0 | 0.5 | 0 |
|---|---|---|
| 0 | 0 | 0.5 |
| 0 | 0 | 0 |

$I_L(-3\pi/4)$

| 0 | 0 | 0 |
|---|---|---|
| 0 | 0 | 0 |
| 0.25 | 0.5 | 0.25 |

$I_L(\pi/2)$

| 0.25 | 0.5 | 0.25 |
|---|---|---|
| 0 | 0 | 0 |
| 0 | 0 | 0 |

$I_L(-\pi/2)$

| 0 | 0 | 0 |
|---|---|---|
| 0 | 0 | 0.5 |
| 0 | 0.5 | 0 |

$I_L(3\pi/4)$

| 0 | 0.5 | 0 |
|---|---|---|
| 0.5 | 0 | 0 |
| 0 | 0 | 0 |

| 0 | 0 | 0 |
|---|---|---|
| 0 | 0 | 1 |
| 0 | 0 | 0 |

$G_H(0)$

| 0 | 0 | 0 |
|---|---|---|
| 1 | 0 | 0 |
| 0 | 0 | 0 |

$G_H(\pi)$

| 0 | 0.5 | 0 |
|---|---|---|
| 0 | 0 | 0.5 |
| 0 | 0 | 0 |

$G_H(\pi/4)$

| 0 | 0 | 0 |
|---|---|---|
| 0.5 | 0 | 0 |
| 0 | 0.5 | 0 |

$G_H(-3\pi/4)$

| 0 | 1 | 0 |
|---|---|---|
| 0 | 0 | 0 |
| 0 | 0 | 0 |

$G_H(\pi/2)$

| 0 | 0 | 0 |
|---|---|---|
| 0 | 0 | 0 |
| 0 | 1 | 0 |

$G_H(-\pi/2)$

| 0 | 0.5 | 0 |
|---|---|---|
| 0.5 | 0 | 0 |
| 0 | 0 | 0 |

$G_H(3\pi/4)$

| 0 | 0 | 0 |
|---|---|---|
| 0 | 0 | 0.5 |
| 0 | 0.5 | 0 |

$G_H(-\pi/4)$

F I G. 13

| 0 | 0 | 0 |
|---|---|---|
| 1 | 0 | 0 |
| 0 | 0 | 0 |

$G_L(0)$

| 0 | 0 | 0 |
|---|---|---|
| 0 | 0 | 1 |
| 0 | 0 | 0 |

$G_L(\pi)$

| 0 | 0 | 0 |
|---|---|---|
| 0.5 | 0 | 0 |
| 0 | 0.5 | 0 |

$G_L(\pi/4)$

| 0 | 0.5 | 0 |
|---|---|---|
| 0 | 0 | 0.5 |
| 0 | 0 | 0 |

$G_L(-3\pi/4)$

| 0 | 0 | 0 |
|---|---|---|
| 0 | 0 | 0 |
| 0 | 1 | 0 |

$G_L(\pi/2)$

| 0 | 1 | 0 |
|---|---|---|
| 0 | 0 | 0 |
| 0 | 0 | 0 |

$G_L(-\pi/2)$

| 0 | 0 | 0 |
|---|---|---|
| 0 | 0 | 0.5 |
| 0 | 0.5 | 0 |

$G_L(3\pi/4)$

| 0 | 0.5 | 0 |
|---|---|---|
| 0.5 | 0 | 0 |
| 0 | 0 | 0 |

FIG. 15A  ↙ BLURRING
   
FIG. 15B            FIG. 15C

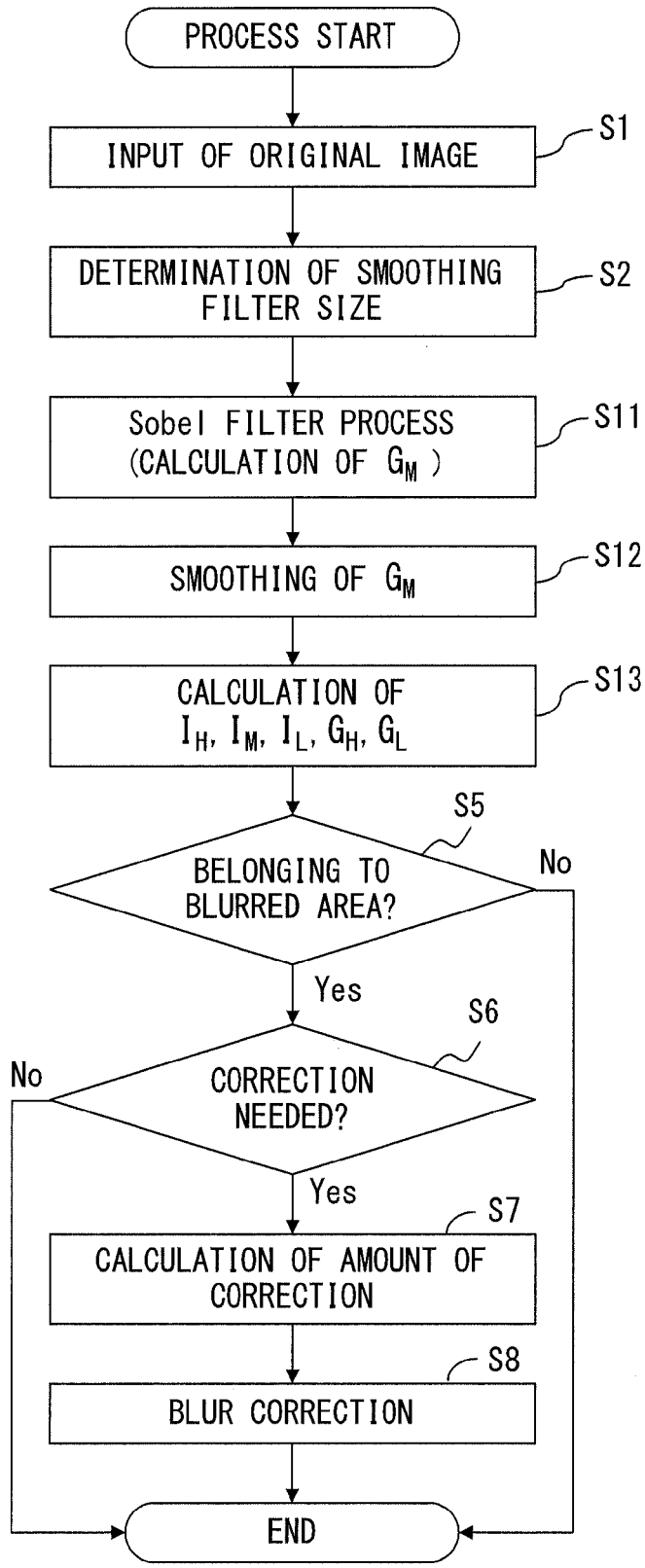
F I G. 16

IMAGE CORRECTION APPARATUS AND IMAGE CORRECTION METHOD

CROSS-REFERENCE TO RELATED APPLICATIONS

This application is a continuation of an international application PCT/JP2008/001371, which was filed on May 30, 2008, the entire contents of which are incorporated herein by reference.

FIELD

The present invention relates to an image correction apparatus and an image correction method. The present invention is applicable to an image correction apparatus and an image correction method, which are intended to correct, for example, a blur of an image.

BACKGROUND

A method using a synthesis of a plurality of successively shot images, and a method for removing (or suppressing) blurring within a single image, are known as techniques of correcting a hand tremor (a tremor caused by movement of a subject is not included here) in a shot image. For example, a method for sharpening an edge of an object or a texture within an image is known as a technique of removing blurring within a single image.

In normal cases, a pixel value (such as brightness, intensity, or the like) changes abruptly at an edge of an object or a texture within an image. A profile illustrated in FIG. 1 represents a change in a pixel value (brightness in this case) of an edge. A horizontal axis of the profile represents a position of a pixel. Since the brightness level ramps up and down at an edge, an area including the edge is sometimes referred to as a ramp area in this specification.

In FIG. 1, in an area (area A) where the brightness level is lower than a central level, the brightness level of each pixel is decreased. In contrast, in an area (area B) where the brightness level is higher than the central level, the brightness level of each pixel is increased. Note that the brightness level is not corrected outside the ramp area. With such corrections, the width of the ramp area is narrowed so as to sharpen the edge. This method is recited, for example, by J.-G Leu, Edge sharpening through ramp width reduction, Image and Vision Computing 18 (2000) 501-514.

However, if this method is applied to an entire image, an unnatural image sometimes results. For example, if the above described corrections are performed for an image where pixel values of an edge are uneven due to an influence of noise or the like, the edge sometimes becomes unnatural or irregular as a result.

A thinning process is proposed as a solution to this problem. However, the thinning process requires a large amount of computation for image processing. Accordingly, it is difficult to provide a thinning function, for example, to a mobile terminal or the like equipped with a camera function that demands a low power consumption and low cost.

An video image signal processing device having a pattern recognition unit, an LPF unit, and a selector so as to overcome a disadvantage caused by edge enhancement is known as a related technique. The pattern recognition unit calculates an evaluation function that indicates the degree of steepness of an edge portion of an input video image signal. The LPF unit includes a plurality of LPFs having mutually different filter characteristics. The selector selects a corresponding LPF based on the evaluation function obtained by the pattern recognition unit. Specifically, an output signal of an LPF for attenuating a high-frequency component in a wider area is selected when the edge of the input image signal is steeper. The selector outputs an input image signal unchanged if the signal has almost no edge portion. The image signal from the selector is input to an edge enhancement circuit (for example, Japanese Laid-open Patent Publication No. 2007-281538).

SUMMARY

According to an aspect of the invention, an image correction apparatus includes a smoothing unit to smooth an input image; a blurred area detection unit to detect, for each pixel of a smoothed image obtained by the smoothing unit, whether or not each of the pixels is included in a blurred area; a correction amount calculation unit to calculate an amount of a correction for a pixel that belongs to the blurred area based on the smoothed image; and a correction unit to correct the input image by using the amount of a correction calculated by the correction amount calculation unit.

According to another aspect of the invention, an image correction method includes smoothing an input image to generate a smoothed image; detecting, for each pixel of the smoothed image, whether or not each of the pixels is included in a blurred area; calculating an amount of a correction for a pixel that belongs to the blurred area based on brightness information of the smoothed image; and correcting the input image by using the calculated amount of a correction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B illustrate implementation examples of a smoothing unit;

FIGS. 5A and 5B illustrate implementation examples of a smoothing filter;

FIG. 7 is a flowchart illustrating operations of the image correction apparatus;

FIGS. 8A and 8B illustrate configurations of Sobel filters;

FIG. 9 illustrates definitions of directions of a gradient;

FIGS. 10 to 12 illustrate filters for calculating a pixel intensity index;

FIGS. 13 and 14 illustrate filters for calculating a gradient index;

FIGS. 15A to 15C illustrate an effect achieved by the image correction apparatus according to the embodiment; and FIG. 16 is a flowchart illustrating operations of another embodiment.

DESCRIPTION OF EMBODIMENTS

Figure 3:
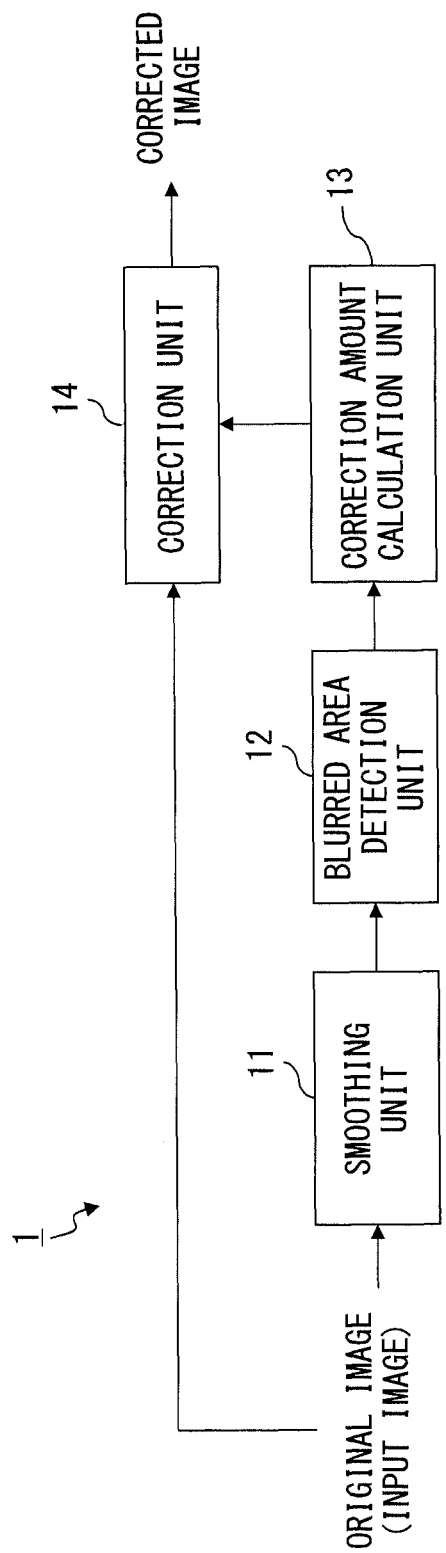
FIG. 3 illustrates a configuration of an image correction apparatus according to an embodiment.

FIG. 3 illustrates a configuration of an image correction apparatus according to an embodiment. The image correction apparatus 1 according to the embodiment corrects, for example, an image obtained with an electronic camera, although the apparatus is not particularly limited. Moreover, the image correction apparatus 1 may correct a hand tremor. A hand tremor is caused, for example, by a moving of a shooting device when an image is shot. Image degradation caused by a hand tremor mainly occurs at an edge of an object or a texture within an image. Accordingly, the image correction apparatus 1 corrects a hand tremor by sharpening an edge.

Figure 1:
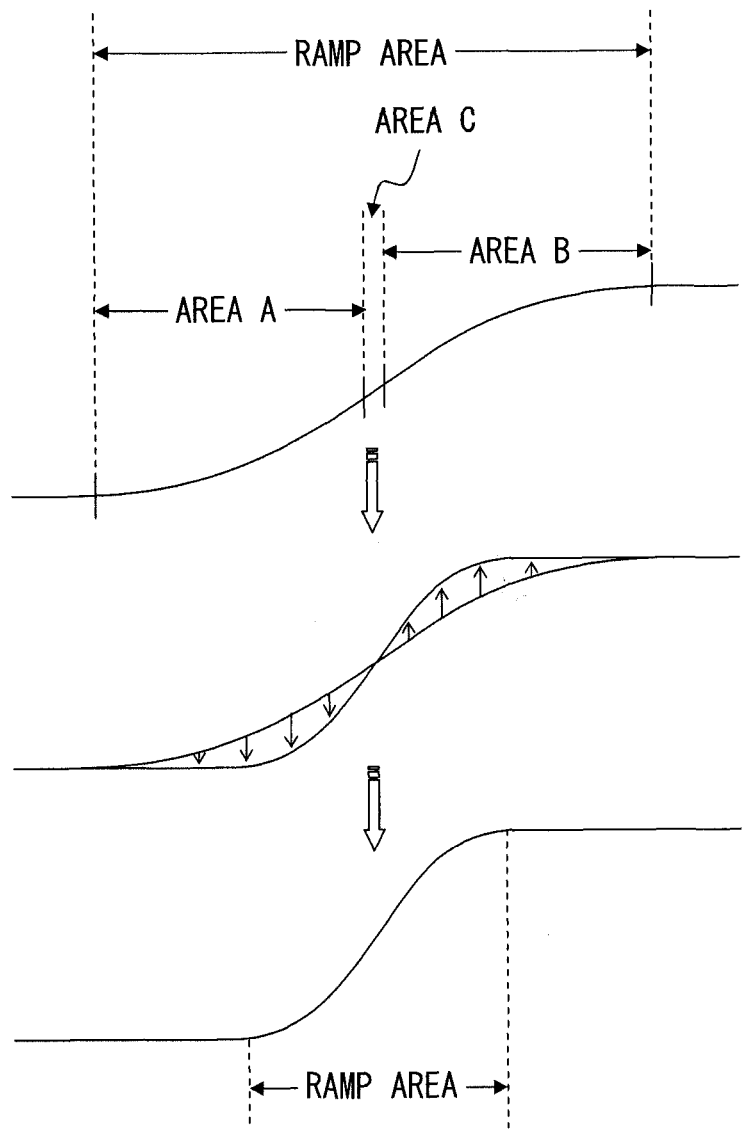
FIG. 1 is an explanatory view of a method for sharpening an edge.

An input image (original image) is provided to a smoothing unit 11 and a correction unit 14. The smoothing unit 11 is, for example, a smoothing (or averaging) filter, and smoothes brightness values of pixels of the input image. With the smoothing process, noise in the input image is removed (or reduced). A blurred area detection unit 12 detects an area where a hand tremor is supposed to occur in a smoothed image output from the smoothing unit 11. Namely, the blurred area detection unit 12 estimates, for each of the pixels of the smoothed image, whether or not a hand tremor has occurred. Image degradation caused by a hand tremor mainly occurs in an edge of an object or a texture within an image, as described above. Moreover, a brightness level is normally inclined in an edge area, as illustrated in FIG. 1. Accordingly, the blurred area detection unit 12 detects a hand tremor area, for example, by detecting an inclination of brightness level in a smoothed image.

A correction amount calculation unit 13 calculates an amount of a correction for a pixel value within a blurred area. The correction unit 14 corrects the input image by using the amount of a correction calculated by the correction amount calculation unit 13. At this time, for example, the correction unit 14 increases a brightness value of a pixel having a brightness level higher than a central level, and decreases a brightness value of a pixel having a brightness level lower than the central level at the edge area, as described with reference to FIG. 1. As a result, each edge within an image becomes sharp.

As described above, the image correction apparatus 1 detects a blurred area by using a smoothed image, and calculates the amount of a correction in the blurred area. At this time, noise has been removed (or reduced) in the smoothed image. Accordingly, the detected blurred area and the calculated amount of a correction are not influenced by noise. Therefore, each edge within an image may be sharpened without being influenced by noise.

FIG. 4A illustrates an implementation example of the smoothing unit 11. The smoothing unit 11 illustrated in FIG. 4A includes an image size detection unit 21, 3×3 filter 22, and 5×5 filter 23. The image size detection unit 21 detects a size of an input image. Namely, for example, the number of pixels of the input image is detected. A method for detecting a size of an image is not particularly limited, and may be implemented with a known technique. The image size detection unit 21 selects the 3×3 filter 22 if the size of the input image is smaller than a threshold value, or selects the 5×5 filter 23 if the size of the input image is larger than the threshold value. The threshold value is, for example, 1M pixels, although the value is not particularly limited.

FIG. 5A illustrates an implementation example of the 3×3 filter 22. The 3×3 filter 22 performs a smoothing operation for each pixel of an input image. Namely, an average of brightness values of a target pixel and eight pixels adjacent to the target pixel (a total of nine pixels) is calculated.

FIG. 5B illustrates an implementation example of the 5×5 filter 23. Similarly to the 3×3 filter 22, the 5×5 filter 23 performs a smoothing operation for each pixel of an input image. However, the 5×5 filter 23 calculates an average of brightness values of a target pixel and 24 pixels adjacent to the target pixel (a total of 25 pixels).

Figure 2:
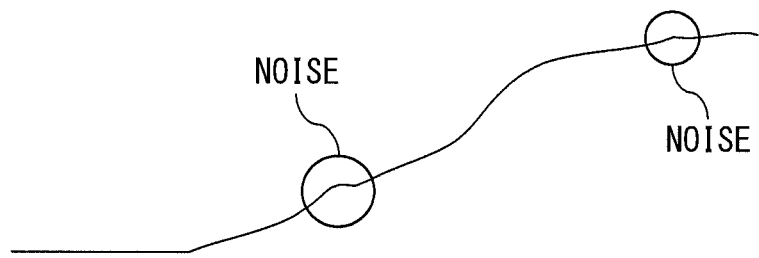
FIG. 2 is an explanatory view of a problem of conventional technique.

As described above, the smoothing unit 11 smoothes an input image by using the filter selected according to the size of an image. Here, the noise (namely, unevenness of an edge) illustrated in FIG. 2 normally increases in an image of a large size. Accordingly, a stronger smoothing process is needed as an image size increases.

In the above described embodiment, either of the two types of filters is selected. However, the image correction apparatus according to the embodiment is not limited to this configuration. Namely, one filter may be selected from among three or more types of filters according to the size of an image. Moreover, FIGS. 5A and 5B respectively illustrate the filters for calculating a simple average of a plurality of pixel values. However, the image correction apparatus according to the embodiment is not limited to this configuration. Namely, a weighted average filter having, for example, a larger weight at a center or in a central area may be used as a filter of the smoothing unit 11.

FIG. 4B illustrates another implementation example of the smoothing unit 11. The smoothing unit 11 illustrated in FIG. 11 includes the 3×3 filter 22, the 5×5 filter 23, and a user instruction acceptance unit 24. In this implementation example, an original image is displayed on a display device. A user inputs information for instructing the strength of the smoothing process according to a width of blurring in the original image displayed on the display device. Then, the user instruction acceptance unit 24 selects a corresponding filter according to the user instruction. In this configuration, the 3×3 filter 22 is selected if the user determines that the blurring width is small, or the 5×5 filter 23 is selected if the user determines that the blurring width is large.

The blurring width of the original image may be detected with software. In this case, the image correction apparatus 1 is configured to select the 3×3 filter 22, for example, if the detected blurring width is equal to or smaller than five pixels, or configured to select the 5×5 filter 23 if the detected blurring width is larger than five pixels.

Figure 6:
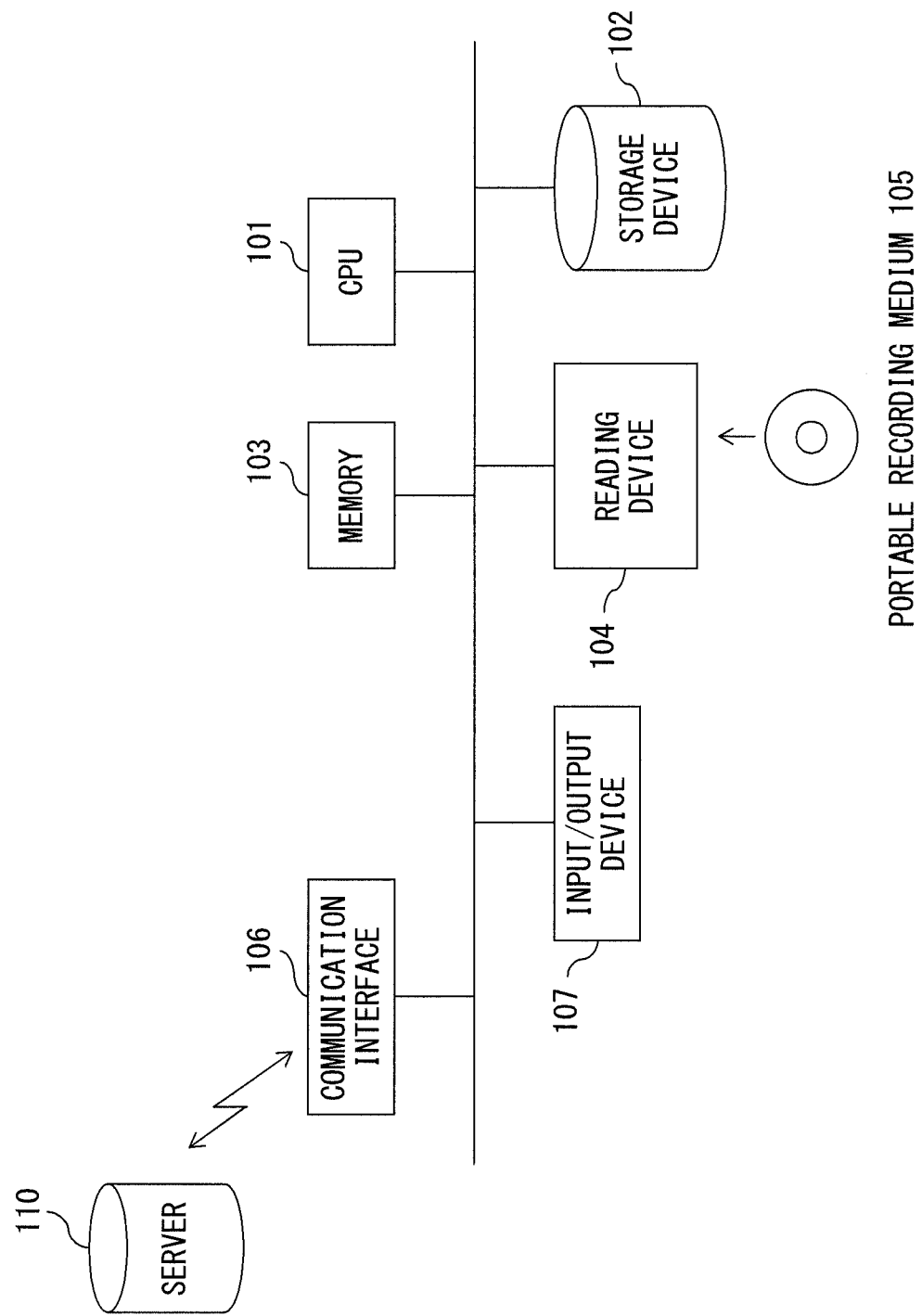
FIG. 6 illustrates a hardware configuration related to the image correction apparatus according to the embodiment.

FIG. 6 illustrates a hardware configuration related to the image correction apparatus 1 according to the embodiment. In FIG. 6, a CPU 101 executes an image correction program by using a memory 103. A storage device 102 is, for example, a hard disk, and stores the image correction program. The storage device 102 may be an external recording device. The memory 103 is, for example, a semiconductor memory. The memory 103 may be configured to include RAM area and ROM area.

A reading device 104 accesses a portable recording medium 105 according to an instruction from the CPU 101. Examples of the portable recording medium 105 include a semiconductor device (PC card or the like), a medium to/from which information is input/output with a magnetic action, and a medium to/from which information is input/output with an optical action. A communication interface 106 transmits and receives data via a network according to an instruction from the CPU 101. An input/output device 107 corresponds to devices such as a camera, a display device, and a device that accepts an instruction from a user.

The image correction program according to this embodiment is provided, for example, in one of the following ways.
(1) Preinstalled in the storage device 102
(2) Provided by the portable recording medium 105
(3) Downloaded from a program server 110

The computer configured as described above executes the image correction program, whereby the image correction apparatus according to the embodiment is implemented.

FIG. 7 is a flowchart illustrating operations of the image correction apparatus 1 according to this embodiment. A process represented by this flowchart is executed upon an input of one original image.

In step S1, original image data is input. The original image data includes pixel values (such as brightness information and the like) of pixels of an original image. In step S2, the size of a smoothing filter is determined. In the configuration illustrated in FIG. 4A, the size of the smoothing filter is determined according to the size of the original image. In contrast, in the configuration illustrated in FIG. 4B, the size of the smoothing filter is determined according to a user instruction. In step S3, the original image is smoothed by using the filter determined in step S2.

In step S4, evaluation indexes $I_H$, $I_M$, $I_L$, $G_H$, $G_M$ and $G_L$, which will be described later, are calculated for each of the pixels of the smoothed image. In step S5, whether or not each of the pixels of the smoothed image belongs to a blurred area is determined by using the evaluation indexes $I_H$, $I_M$ and $I_L$. Then, steps S6 to S8 are executed for a pixel determined to belong to the blurred area.

In step S6, whether or not to correct the brightness value of the target pixel is determined by using the evaluation indexes $G_H$, $G_M$ and $G_L$ for the target pixel. If the brightness value of the target pixel is determined to be corrected, the amount of a correction is calculated by using the evaluation indexes $I_H$, $I_M$, $I_L$, $G_H$, $G_M$ and $G_L$ in step S7. Then, in step S8, the original image is corrected according to the calculated amount of a correction.

The processes in steps S2 and S3 are executed by the smoothing unit 11 illustrated in FIG. 3. Steps S4 to S8 correspond to processes for sharpening an edge by narrowing the width of a ramp area (an area where a brightness level is inclined) of the edge. The processes of steps S4 to S8 are described below.

Calculation of Evaluation Indexes (Step S4)

Sobel operations are performed for each of the pixels of the smoothed image. For the Sobel operations, Sobel filters, illustrated in FIGS. 8A and 8B, are used. In the Sobel operations, a target pixel and eight pixels adjacent to the target pixel are used. FIG. 8A illustrates a configuration of a Sobel filter in X direction, whereas FIG. 8B illustrates a configuration of a Sobel filter in Y direction. A Sobel operation in the X direction and a Sobel operation in the Y direction are performed for each of the pixels. Results of the Sobel operations in the X direction and the Y direction are hereinafter referred to as "gradX" and "gradY", respectively.

The magnitude of a gradient of brightness is calculated for each of the pixels by using the results of the Sobel operations. The magnitude "gradMag" of the gradient is calculated, for example, with the following equation (1).

$$\text{gradMag} = \sqrt{\text{gradX}^2 + \text{gradY}^2} \quad (1)$$

Alternatively, the gradient may be calculated with the following equation (2) in order to reduce the amount of computation.

$$\text{gradMag} = |\text{gradX}| + |\text{gradY}| \quad (2)$$

Then, a direction of the gradient is obtained for each of the pixels by using the results of the Sobel operations. The direction "PixDirection(θ)" of the gradient is obtained with the following equation (3). If "gradX" is close to zero (for example, gradX<$10^{-6}$, PixDirection=$-\pi/2$ is assumed.

$$\text{PixDirection}(\theta) = \arctan\left(\frac{\text{gradY}}{\text{gradX}}\right) \quad (3)$$

Next, it is determined, for each of the pixels, which of Zone 1 to Zone 8 illustrated in FIG. 9 the direction of the gradient belongs to. Zone 1 to Zone 8 are as follows.
Zone1: $0 \leq \text{PixDirection} < \pi/4$ and gradX>0
Zone2: $\pi/4 \leq \text{PixDirection} < \pi/2$ and gradY>0
Zone3: $-\pi/2 \leq \text{PixDirection} < -\pi/4$ and gradY<0
Zone4: $-\pi/4 \leq \text{PixDirection} < 0$ and gradX<0
Zone5: $0 \leq \text{PixDirection} < \pi/4$ and gradX<0
Zone6: $\pi/4 \leq \text{PixDirection} < \pi/2$ and gradY<0
Zone7: $-\pi/2 \leq \text{PixDirection} < -\pi/4$ and gradY>0
Zone8: $-\pi/4 \leq \text{PixDirection} < 0$ and gradX>0

Then, the pixel intensity indexes $I_H$, $I_M$ and $I_L$ are calculated for each of the pixels of the smoothed image. The pixel intensity indexes $I_H$, $I_M$ and $I_L$ depend on the direction of the gradient obtained with the above equation (3). An example of calculating the pixel intensity indexes $I_H$, $I_M$ and $I_L$ when the direction of the gradient belongs to Zone 1 ($0 \leq \theta < \pi/4$) is described as an implementation example. The direction of the gradient of a pixel (i,j) is hereinafter referred to as "θ (i,j)".

Initially, the following equations are defined for "θ=0". "P(i,j)" represents a brightness value of a pixel positioned at coordinates (i,j). "P(i,j+1)" represents a brightness value of a pixel positioned at coordinates (i,j+1). The similar expressions are applied to the other pixels.

$$I_H(0) = 0.25 \times \{P(i+1,j+1) + 2 \times P(i,j+1) + P(i-1,j+1)\}$$

$$I_M(0) = 0.25 \times \{P(i+1,j) + 2 \times P(i,j) + P(i-1,j)\}$$

$$I_L(0) = 0.25 \times \{P(i+1,j-1) + 2 \times P(i,j-1) + P(i-1,j-1)\}$$

Similarly, the following equations are defined for "θ=π/4".

$$I_H(\pi/4) = 0.5 \times \{P(i+1,j) + P(i,j+1)\}$$

$$I_M(\pi/4) = 0.25 \times \{P(i+1,j-1) + 2 \times P(i,j) + P(i-1,j+1)\}$$

$$I_L(\pi/4) = 0.5 \times \{P(i,j-1) + P(i-1,j)\}$$

Here, the three pixel intensity indexes of Zone 1 are calculated with linear interpolation using the pixel intensity indexes of "θ=0" those of "θ=π/4". Namely, the three pixel intensity indexes of Zone 1 are calculated with the following equations.

$$I_{H,Zone1} = I_H(0) \times \omega + I_H(\pi/4) \times (1-\omega)$$

$$I_{M,Zone1} = I_M(0) \times \omega + I_M(\pi/4) \times (1-\omega)$$

$$I_{L,Zone1} = I_L(0) \times \omega + I_L(\pi/4) \times (1-\omega)$$

$$\omega = 1 - \{4 \times \theta(i,j)\}/\pi$$

Also the pixel intensity indexes of Zone 2 to Zone 8 are calculated with similar procedures. Namely, the pixel intensity indexes are respectively calculated for "θ=0, π/4, π/2, 3π/4, π, -3π/4, -π/2, and -π/4". These pixel intensity indexes are respectively obtained by performing 3×3 filter computation for the brightness value of each of the pixels of the smoothed image. FIGS. 10, 11 and 12 illustrate configurations of filters for respectively obtaining the pixel intensity indexes $I_H$, $I_M$ and $I_L$.

By using these filters, the pixel intensity indexes $I_H$, $I_M$ and $I_L$ in the eight directions are calculated. The pixel intensity indexes $I_H$ of the Zones are respectively calculated with the following equations by using the pixel intensity indexes $I_H$ in two corresponding directions.

$I_{H,Zone1} = I_H(0) \times w15 + I_H(\pi/4) \times (1-w15)$ $I_{H,Zone2} = I_H(\pi/2) \times w26 + I_H(\pi/4) \times (1-w26)$ $I_{H,Zone3} = I_H(\pi/2) \times w37 + I_H(3\pi/4) \times (1-w37)$ $I_{H,Zone4} = I_H(\pi) \times w48 + I_H(3\pi/4) \times (1-w48)$ $I_{H,Zone5} = I_H(\pi) \times w15 + I_H(-3\pi/4) \times (1-w15)$ $I_{H,Zone6} = I_H(-\pi/2) \times w26 + I_H(-3\pi/4) \times (1-w26)$ $I_{H,Zone7} = I_H(-\pi/2) \times w37 + I_H(-\pi/4) \times (1-w37)$ $I_{H,Zone8} = I_H(0) \times w48 + I_H(-\pi/4) \times (1-w48)$ where w15, w26, w37 and w48 are respectively represented with the following equations.

$W15 = 1 - 4\theta/\pi$ $W26 = 4\theta/\pi - 1$ $W37 = -1 - 4\theta/\pi$ $W48 = 1 + 4\theta/\pi$ Additionally, the pixel intensity indexes $I_M$ of the Zones are respectively calculated with the following equations by using the pixel intensity indexes $I_M$ in two corresponding directions.

$I_{M,Zone1} = I_M(0) \times w15 + I_M(\pi/4) \times (1-w15)$ $I_{M,Zone2} = I_M(\pi/2) \times w26 + I_M(\pi/4) \times (1-w26)$ $I_{M,Zone3} = I_M(\pi/2) \times w37 + I_M(3\pi/4) \times (1-w37)$ $I_{M,Zone4} = I_M(\pi) \times w48 + I_M(3\pi/4) \times (1-w48)$ $I_{M,Zone5} = I_M(\pi) \times w15 + I_M(-3\pi/4) \times (1-w15)$ $I_{M,Zone6} = I_M(-\pi/2) \times w26 + I_M(-3\pi/4) \times (1-w26)$ $I_{M,Zone7} = I_M(-\pi/2) \times w37 + I_M(-\pi/4) \times (1-w37)$ $I_{M,Zone8} = I_M(0) \times w48 + I_M(-\pi/4) \times (1-w48)$ Similarly, the pixel intensity indexes $I_L$ of the Zones are respectively calculated with the following equations by using the pixel intensity indexes $I_L$ in two corresponding directions.

$I_{L,Zone1} = I_L(0) \times w15 + I_L(\pi/4) \times (1-w15)$ $I_{L,Zone2} = I_L(\pi/2) \times w26 + I_L(\pi/4) \times (1-w26)$ $I_{L,Zone3} = I_L(\pi/2) \times w37 + I_L(3\pi/4) \times (1-w37)$ $I_{L,Zone4} = I_L(\pi) \times w48 + I_L(3\pi/4) \times (1-w48)$ $I_{L,Zone5} = I_L(\pi) \times w15 + I_L(-3\pi/4) \times (1-w15)$ $I_{L,Zone6} = I_L(-\pi/2) \times w26 + I_L(-3\pi/4) \times (1-w26)$ $I_{L,Zone7} = I_L(-\pi/2) \times w37 + I_L(-\pi/4) \times (1-w37)$ $I_{L,Zone8} = I_L(0) \times w48 + I_L(-\pi/4) \times (1-w48)$ When the pixel intensity indexes $I_H$, $I_M$ and $I_L$ are calculated for each of the pixels as described above, the following procedures are executed.
(a) The direction θ of the gradient is calculated.
(b) The Zone corresponding to θ is detected.
(c) A filter computation is performed by using a set of filters corresponding to the detected Zone. For example, if θ belongs to Zone 1, $I_H(0)$ and $I_H(\pi/4)$ are calculated by using the filters illustrated in FIG. 10. Similar calculations are performed for $I_M$ and $I_L$.
(d) $I_H$, $I_M$ and $I_L$ are calculated on results of the computations of the set of filters obtained in the above described (c) and based on θ.

Next, the gradient indexes $G_H$, $G_M$ and $G_L$ are calculated for each of the pixels of the smoothed image. Similarly to the pixel intensity indexes $I_H$, $I_M$ and $I_L$, the gradient indexes $G_H$, $G_M$ and $G_L$ depend on the direction of the gradient obtained with the above equation (3). Accordingly, an example of calculating the gradient indexes $G_H$, $G_M$ and $G_L$ of Zone 1 ($0 \leq \theta < \pi/4$) is described in a similar manner to the pixel intensity indexes.

Initially, the following equations are defined for "θ=0". "gradMag(i,j)" represents the magnitude of the gradient of the pixel positioned at the coordinates (i,j). "gradMag(i+1,j)" represents the magnitude of the gradient of the pixel positioned at the coordinates (i+1,j). The similar expressions are applied to other pixels.

$G_H(0) = \text{gradMag}(i, j+1)$ $G_M(0) = \text{gradMag}(i, j)$ $G_L(0) = \text{gradMag}(i, j-1)$ Similarly, the following equations are defined for "θ=π/4".

$G_H(\pi/4) = 0.5 \times \{\text{gradMag}(i+1,j) + \text{gradMag}(i,j+1)\}$ $G_M(\pi/4) = \text{gradMag}(i,j)$ $G_L(\pi/4) = 0.5 \times \{\text{gradMag}(i,j-1) + \text{gradMag}(i-1,j)\}$ Here, the gradient indexes of Zone 1 are calculated with linear interpolation using the gradient indexes of "θ=0" and those of "θ=π/4". Namely, the gradient indexes of Zone 1 are calculated with the following equations.

$G_{H,Zone1} = G_H(0) \times \omega + G_H(\pi/4) \times (1-\omega)$ $G_{M,Zone1} = G_M(0) \times \omega + G_M(\pi/4) \times (1-\omega) = \text{gradMag}(i,j)$ $G_{L,Zone1} = G_L(0) \times \omega + G_L(\pi/4) \times (1-\omega)$ $\omega = 1 - \{4 \times \theta(i,j)\}/\pi$ As described above, the gradient index $G_M$ is always "gradMag(i,j)" and does not depend on the direction θ of the gradient. Namely, the gradient index $G_M$ of each of the pixels is calculated using the above described equation (1) or (2) regardless of the direction θ of the gradient.

Also, the gradient indexes of Zone 2 to Zone 8 are calculated using similar procedures. Namely, the gradient indexes are respectively calculated for "θ=0, π/4, π/2, 3π/4, π, −3π/4, −π/2, and −π/4". These gradient indexes are obtained by respectively performing the 3×3 filter computation for the magnitude gradMag of the gradient of each of the pixels of the smoothed image. FIGS. 13 and 14 illustrate configurations of filters for respectively obtaining the gradient indexes $G_H$ and $G_L$.

By performing such filter computations, the gradient indexes $G_H$ and $G_L$ in the eight directions are obtained. The gradient indexes $G_H$ of the Zones are respectively calculated with the following equations by using the gradient indexes $G_H$ in two corresponding directions.

$G_{H,Zone1} = G_H(0) \times w15 + G_H(\pi/4) \times (1-w15)$ $G_{H,Zone2} = G_H(\pi/2) \times w26 + G_H(\pi/4) \times (1-w26)$ $G_{H,Zone3} = G_H(\pi/2) \times w37 + G_H(3\pi/4) \times (1-w37)$ $G_{H,Zone4} = G_H(\pi) \times w48 + G_H(3\pi/4) \times (1-w48)$ $G_{H,Zone5} = G_H(\pi) \times w15 + G_H(-3\pi/4) \times (1-w15)$ $G_{H,Zone6} = G_H(-\pi/2) \times w26 + G_H(-3\pi/4) \times (1-w26)$ $G_{H,Zone7} = G_H(-\pi/2) \times w37 + G_H(-\pi/4) \times (1-w37)$ $G_{H,Zone8} = G_H(0) \times w48 + G_H(-\pi/4) \times (1-w48)$ where w15, w26, w37 and w48 are respectively represented by the following equations.

$W15 = 1 - 4\theta/\pi$ $W26 = 4\theta/\pi - 1$ $W37 = -1 - 4\theta/\pi$ $W48 = 1 + 4\theta/\pi$ Similarly, the gradient indexes $G_L$ of the Zones are respectively calculated with the following equations by using the gradient indexes $G_L$ in two corresponding directions.

$G_{L,Zone1} = G_L(0) \times w15 + G_L(\pi/4) \times (1-w15)$ $G_{L,Zone2} = G_L(\pi/2) \times w26 + G_L(\pi/4) \times (1-w26)$ $G_{L,Zone3} = G_L(\pi/2) \times w37 + G_L(3\pi/4) \times (1-w37)$ $G_{L,Zone4} = G_L(\pi) \times w48 + G_L(3\pi/4) \times (1-w48)$ $G_{L,Zone5} = G_L(\pi) \times w15 + G_L(-3\pi/4) \times (1-w15)$ $G_{L,Zone6} = (-\pi/2) \times w26 + G_L(-3\pi/4) \times (1-w26)$ $G_{L,Zone7} = G_L(-\pi/2) \times w37 + G_L(-\pi/4) \times (1-w37)$ $G_{L,Zone8} = (0) \times w48 + (-\pi/4) \times (1-w48)$ When the gradient indexes $G_H$, $G_M$ and $G_L$ are calculated for each of the pixels as described above, the following procedures are executed.
(a) The magnitude gradMag of the gradient is calculated.
(b) $G_M$ is calculated based on gadMag.
(c) The direction θ of the gradient is calculated.
(d) A Zone corresponding to θ is detected.
(e) A filter computation is performed by using a set of filters corresponding to the detected Zone. For example, if θ belongs to Zone 1, $G_H(0)$ and $G_H(\pi/4)$ are calculated by using the filters illustrated in FIG. 13. $G_L$ is calculated in similar way.
(f) $G_H$ and $G_L$ are calculated based on results of the computations of the set of filters obtained in the above described (e) and based on θ.

As described above, the evaluation indexes (the pixel intensity indexes $I_H$, $I_M$ and $I_L$ and the gradient indexes $G_H$, $G_M$ and $G_L$) are calculated for each of the pixels of the smoothed image in step S4. These evaluation indexes are used to detect a blurred area, and to calculate the amount of a correction.

Detection of a Blurred Area (Step S5)

The blurred area detection unit 12 checks, for each of the pixels of the smoothed image, whether or not the condition represented by the following equation (4) is satisfied. Equation (4) represents that a target pixel is positioned halfway of a brightness slope.

$I_H > I_M > I_L$ (4)

A pixel having pixel intensity indexes that satisfy equation (4) is determined to belong to a blurred area. Namely, the pixel that satisfies equation (4) is determined to be corrected. In contrast, a pixel having pixel intensity indexes that do not satisfy equation (4) is determined to not belong to the blurred area. Namely, the pixel that does not satisfy equation (4) is determined not to be corrected. Pixels within the ramp area illustrated in FIG. 1 are probably determined to belong to the blurred area according to equation (4).

Calculation of the Amount of a Correction (Steps S6 and S7)

The correction amount calculation unit 13 checks whether or not each pixel that is determined to belong to the blurred area satisfies Cases (1) to (3) following.

$G_H > G_M > G_L$      Case1

$G_H < G_M < G_L$      Case2

$G_H < G_M$ and $G_L < G_M$      Case3

Case 1 represents a situation in which the gradient of brightness becomes steeper. Accordingly, a pixel belonging to Case 1 is considered to belong to the area (area A) where the brightness level is lower than the central level in the ramp area of the edge illustrated in FIG. 1. In the meantime, Case 2 represents a situation in which the gradient of brightness becomes more moderate. Accordingly, a pixel belonging to Case 2 is considered to belong to the area (area B) where the brightness level is higher than the central level. Case 3 represents a situation in which the gradient of the target pixel is higher than those of adjacent pixels. Namely, a pixel belonging to Case 3 is considered to belong to an area (area C) where the brightness level is the central level or about the central level.

The correction amount calculation unit 13 calculates the amount of a correction for the brightness level of each pixel that is determined to belong to the blurred area.

If a pixel belongs to Case 1 (namely, if the pixel is positioned in the low brightness area within the ramp area), the amount of a correction Leveldown of the brightness of the pixel is represented with the following equation. "S" is a correction factor, and "θ" is obtained with equation (3) described above.

$$\text{If } \frac{G_H - G_M}{G_M - G_L} \geq 0.5 \; Leveludown(i, j) = (I_M - I_L) \times S$$

$$\text{else } Leveldown(i, j) = (I_M - I_L) \times \frac{2(G_H - G_M)}{G_M - G_L} S$$

$$S = 1 - (1 - \sqrt{2})\frac{4\theta}{\Pi}$$

If a pixel belongs to Case 2 (namely, if the pixel is positioned in the high brightness area within the ramp area), the amount of a correction Levelup of the brightness of the pixel is represented with the following equation.

$$\text{If } \frac{G_L - G_M}{G_M - G_H} \geq 0.5 \; Levelup(i, j) = (I_H - I_M) \times S$$

$$\text{else } Levelup(i, j) = (I_H - I_M) \times \frac{2(G_L - G_M)}{G_M - G_H} S$$

If a pixel belongs to Case 3 (namely, if the pixel is positioned in the central area within the ramp area), the amount of a correction is zero. The amount of a correction is zero also if a pixel belongs to none of Cases 1 to 3.

Correction (Step S8)

The correction unit 14 corrects the pixel value (such as the brightness level) of each of the pixels of the original image.

Here, pixel data "Image(i,j)" acquired with a correction performed for the pixel (i,j) is obtained with the following equation. "Original(i,j)" is pixel data of the pixel (i,j) of the original image.

Image(i,j)=Original(i,j)−Leveldown(i,j)  Case 1

Image(i,j)=Original(i,j)+Levelup(i,j)  Case 2

Image(i,j)=Original(i,j)  Other cases

FIGS. 15A to 15C illustrate an effect achieved by the image correction apparatus 1 according to this embodiment. A description provided here assumes that an original image, illustrated in FIG. 15A, is input. FIG. 15B illustrates an image processed with the method recited in the above J.-G Leu, Edge sharpening through ramp width reduction, Image and Vision Computing 18 (2000) 501-514. FIG. 15C illustrates an image processed by the image correction apparatus 1 according to this embodiment. With the image correction apparatus 1 according to this embodiment, noise of an edge is reduced as illustrated in FIG. 15C. Namely, the image correction apparatus 1 according to this embodiment suitably corrects a blurring of an image.

As described above, the image correction apparatus 1 according to this embodiment detects a pixel belonging to a ramp area of an edge by using a smoothed image. Moreover, the amount of a correction is calculated for each pixel thus detected by using the smoothed image. Since the amount of a correction is calculated by using the smoothed image at this time, the influence of noise in an original image is removed (or reduced). Each pixel of the original image is corrected according to the amount of a correction thus calculated. Accordingly, an edge is sharpened without being influenced by the noise of the original image.

The detection of a blurred area is performed in each of a plurality of different gradient directions. Accordingly, the blurred area is detected with high accuracy.

The removal of an influence of noise is performed by smoothing an original image before the evaluation indexes are calculated. Here, a process for smoothing an original image is performed, for example, with a simple filter computation. Therefore, the amount of the computation is small. Accordingly, with an image correction method according to this embodiment, an edge of an image is sharpened to suitably correct a blurring without greatly increasing the amount of computation.

Other Embodiments

In the above described embodiment, an original image is smoothed, and the amount of a correction for each pixel is calculated by using the smoothed image. In contrast, with a correction method according to another embodiment, some of the gradient indexes are smoothed.

FIG. 16 is a flowchart illustrating operations of the other embodiment. The same step numbers in FIG. 7 and FIG. 16 represent the same processes.

In step S11, Sobel operations are initially performed for each pixel of an original image. The Sobel operations have already been described with reference to FIGS. 8A and 8B. Then, the gradient index $G_M$ (=gradMag) is calculated for each pixel by using results of the Sobel operations. The gradient index $G_M$ is obtained with equation (1) or (2) described above.

In step S12, a smoothing process is executed for the calculated gradient index $G_M$. In the smoothing process, a smoothing filter of a size determined in step S2 is used. For example, if the 3×3 filter illustrated in FIG. 5A is used, an average value of the gradient indexes $G_M$ of a target pixel and eight pixels adjacent to the target pixel (namely, a total of nine pixels) is calculated for each pixel.

In step S13, the other evaluation indexes (the pixel intensity indexes $I_H$, $I_M$ and $I_L$, and the gradient indexes $G_H$ and $G_L$) are calculated for each pixel of the original image (or each pixel obtained with the Sobel operations). The method for calculating these evaluation indexes has been described above. In steps S5 to S8, each pixel of the original image is corrected by using the smoothed gradient index $G_M$ and the other evaluation indexes obtained in step S13.

Furthermore, this application discloses the following configurations.

An image correction apparatus for sharpening an edge of an input image includes a smoothing unit, a correction amount calculation unit, and a correction unit. The smoothing unit smoothes the input image to generate a smoothed image. The correction amount calculation unit calculates, for each pixel of the smoothed image, an amount of a correction for sharpening the edge based on a pixel value of the smoothed image. The correction unit corrects a pixel value of each of the pixels of the input image by using the amount of a correction calculated by the correction amount calculation unit.

An image correction apparatus includes a calculation unit, a smoothing unit, a blurred area detection unit, a correction amount calculation unit, and a correction unit. The calculation unit calculates, for each pixel of an input image, a plurality of pixel intensity indexes and a plurality of gradient indexes based on brightness values of a target pixel and pixels adjacent to the target pixel. The smoothing unit smoothes at least one of the plurality of gradient indexes. The blurred area detection unit detects a blurred area by using the pixel intensity indexes and the gradient indexes at least one of which is smoothed. The correction amount calculation unit calculates, for a pixel that belongs to the blurred area, an amount of a correction based on the pixel intensity indexes and the gradient indexes at least one of which is smoothed. The correction unit corrects the input image by using the amount of a correction calculated by the correction amount calculation unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. An image correction apparatus, comprising:
   a calculator configured to calculate pixel intensity index and gradient index for each pixel of an input image based on brightness values of a target pixel and its adjacent pixels;
   a smoothing unit configured to smooth the gradient index of each pixel;
   a blurred area detection unit configured to detect, for each pixel, whether or not each pixel is included in a blurred area, by using the pixel intensity index and the smoothed gradient index of a corresponding pixel;
   a correction amount calculation unit configured to calculate an amount of a correction for a pixel that belongs to the blurred area based on the pixel intensity index and the smoothed gradient index of a corresponding pixel; and a correction unit configured to receive the input image not via the smoothing unit and to correct the input image, that is not smoothed by the smoothing unit, by using the amount of a correction calculated by the correction amount calculation unit.

2. The image correction apparatus according to claim 1, wherein the smoothing unit is a smoothing filter for averaging gradient indexes of a plurality of pixels.

3. The image correction apparatus according to claim 1, further comprising a size detection unit configured to detect an image size of the input image, wherein a filter size of the smoothing unit is determined according to the image size.

4. The image correction apparatus according to claim 3, wherein the input image is smoothed with a 3×3 smoothing filter if the image size of the input image is smaller than a threshold value and smoothed with a 5×5 smoothing filter if the image size of the input image is larger than the threshold value.

5. The image correction apparatus according to claim 1, wherein a filter size of the smoothing unit is determined according to an instruction from a user.

6. An image correction method implemented by a computer, the method comprising:

calculating pixel intensity index and gradient index for each pixel of an input image based on brightness values of a target pixel and its adjacent pixels;

smoothing the gradient index of each pixel;

detecting, for each pixel, whether or not each pixel is included in a blurred area, by using the pixel intensity index and the smoothed gradient index of a corresponding pixel;

calculating an amount of a correction for a pixel that belongs to the blurred area based on the pixel intensity index and the smoothed gradient index of a corresponding pixel; and correcting the input image, that is not smoothed by the smoothing, by using the calculated amount of a correction.

7. A non-transitory computer-readable recording medium on which is recorded an image correction program for causing a computer to execute an image correction method, the method comprising:

calculating pixel intensity index and gradient index for each pixel of an input image based on brightness values of a target pixel and its adjacent pixels;

smoothing the gradient index of each pixel;

detecting, for each pixel, whether or not each pixel is included in a blurred area, by using the pixel intensity index and the smoothed gradient index of a corresponding pixel;

calculating an amount of a correction for a pixel that belongs to the blurred area based on the pixel intensity index and the smoothed gradient index of a corresponding pixel; and correcting the input image, that is not smoothed by the smoothing, by using the calculated amount of a correction.

* * * * *